Oct. 26, 1954      W. JUDA      2,692,855
METHOD OF AND APPARATUS FOR STERILIZING LIQUIDS
Filed April 5, 1951
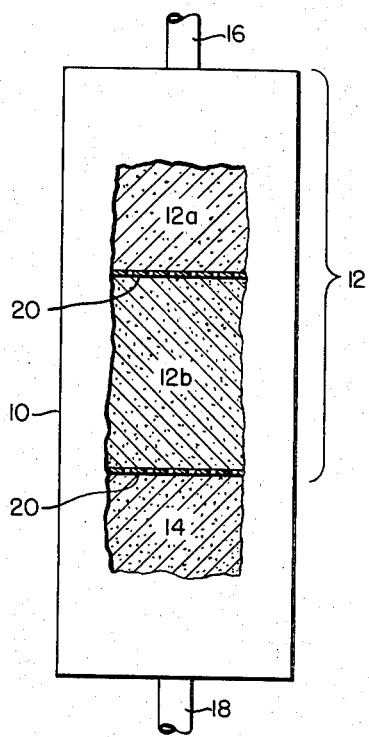
INVENTOR.
WALTER JUDA
BY
ATTORNEYS Patented Oct. 26, 1954

2,692,855

UNITED STATES PATENT OFFICE 2,692,855

METHOD OF AND APPARATUS FOR STERILIZING LIQUIDS

Walter Juda, Lexington, Mass., assignor to Ionics, Incorporated, Cambridge, Mass., a corporation of Massachusetts Application April 5, 1951, Serial No. 219,503

3 Claims. (Cl. 210—24)

This invention relates to an ion exchange method of demineralizing and sterilizing liquids and liquid solutions and to apparatus therefor.

Commonly demineralized sterile water, for example, for medical purposes, is obtained by distillation requiring costly, relatively large, stationary stills. In recent years, the process of demineralizing water and solutions in mixed or separate beds by means of cation exchangers in the hydrogen form (hydrogen exchangers) and anion exchangers in the hydroxyl form (hydroxyl exchangers) has advanced to such a degree that ion exchange demineralization of common water supples now competes very favorably with distillation. However, ion exchange methods previously known, do not decrease the population of micro-organisms sufficiently to permit the use of demineralized water for medical and like purposes. For this reason, waters which have been demineralized by ion exchange could not be used in place of distilled water in the many applications where sterility is of prime importance, that is, particularly in the medical, pharmaceutical, and food process fields. Furthermore, in many cases in the pharmaceutical and cosmetic fields, sterile demineralized solutions of non-volatile organic compounds are required and can not be obtained except by relatively costly heating and/or distillation equipment. Often the organic substances in, for example, aqueous solution, are susceptible to decomposition by the action of bacterial or other micro-organisms. In many instances, solutions of such organic substances, for example, sugar, also carry ash which interferes with the processing of these solutions (in the case of sugar solutions, with the crystallizing of sugar). It is, therefore, desirable both to demineralize and to sterilize such solutions. In many cases, distillation cannot be used for this purpose because of the non-volatility of both the organic material and the ash, and in some instances, because of the heat sensitivity of the organic material. Ion exchange resins are also widely used to demineralize liquids and solutions or dispersions of non-ionized substances in water and other liquids.

The state of the art of ion exchange demineralization is well described in "Ion Exchange Resins" by Robert Kunin and Robert J. Myers, published by John Wiley & Sons, Inc., New York (1950), and "Ion Exchange," edited by F. C. Nachod, published by Academic Press, Inc., New York, N. Y. (1949).

This invention provides a convenient and economical method of demineralizing and sterilizing liquids by treatment with ion exchange resins. An important feature of this invention is that the liquid to be treated need not be caused to undergo any change of phase and the process may be carried out at any convenient temperature. Sterilization and demineralization may be achieved without contaminating the product and without altering its chemical structure. A further object is to provide apparatus for practicing the process.

It has now been found that solutions containing ionized salts, with or without dissolved or dispersed non-ionized substances, may be substantially demineralized and sterilized by demineralizing the solution by a conventional ion exchange process wherein the cations are replaced by hydrogen ions and the anions are replaced by hydroxyl ions, and contacting the demineralized solution with a cation exchange resin in the silver form.

Cation exchange resins may be prepared in the silver form, for example, by contacting the resin in the sodium form with a solution of silver nitrate, and washing free of uncombined silver with demineralized water. A preliminary demineralization is necessary, for if solutions containing dissolved ionized substances are contacted with such a resin (silver exchanger), considerable quantities of silver are removed from the resin by the exchange of solution cations for silver ions. As a consequence, a decrease in, and eventual loss of, sterilizing power of the resin results, even if there occurs the formation of non-ionized or insoluble silver compounds (which usually possess little or no sterilizing power). On the other hand, if soluble silver ions are passed into solution by ion exchange, though still retaining bactericidal power, they may be present in undesirably large quantities in the treated solution. At any rate, the exchange of silver ions for solution cations constitutes an expensive loss.

A preliminary demineralization is conveniently effected by contacting the solution with a cation exchange resin in the hydrogen form and with an anion exchange resin in the hydroxyl form. As long as the demineralizing action of the hydrogen and hydroxyl resins maintains low levels of ionized substances in the solution, the silver resin does not introduce significant quantities of silver ions into solution and yet a powerful sterilizing action is exerted. Preferably, water or other liquids or solutions are sterilized and demineralized by first demineralizing by means of a regenerable two-step or mixed-bed ion exchange treatment and subsequently passing the demineralized liquid through a silver exchanger. The resulting liquid is substantially free from silver ions and is sterile, that is, substantially free of living micro-organisms. We have found that by this method water of pharmaceutical quality comparable to that produced by distillation may be prepared. Sugar solutions treated by this method have greatly improved storage properties. The amount of silver ions passing from the silver exchanger to the treated liquid is suitably small so that the quantity of silver ions in solution is, for the most part, negligible.

Cation exchangers in the silver form may be prepared from strongly acid exchangers (such as those based on cross linked sulfonated polystyrene described in U. S. Patent 2,366,007) in the hydrogen form, or from weakly acid exchangers (such as those described in U. S. Patent 2,340,111).

Particularly satisfactory strongly acid exchangers may be based upon cross-linked sulfonated polystyrenes; and satisfactory weakly acid exchangers may be a polymethacrylic acid exchanger having carboxylic acid groups as the principal active groups.

In the course of sterilization by this invention, the sterilizing power of the cation exchanger in the silver form may, at any time, be regenerated by contacting with a solution of a silver salt and washing free from excess silver salt. We have found that if the liquid contacting the silver exchanger has a pH greater than 4 but less than 10, and has less than 50 p. p. m. of dissolved ionized substances, the concentration of silver ions effluent from the exchanger is suitably low.

This invention will be better understood from the following examples describing in detail representative and preferred embodiments of this invention. In the drawing is shown in cross-section elevation suitable apparatus for practicing this invention.

*Example I.—Sterile chemically pure water*

Tap water containing about 100 p. p. m. of dissolved ionized substances of which about 90% were hardness producing solids was passed through a mixed bed (see "Ion Exchange Resins," page 109 et seq.) containing as hydrogen exchanger a cross linked sulfonated polystyrene exchanger of the type described in U. S. Patent 2,366,007; and as hydroxyl exchanger, a strongly basic anion exchange resin of the quaternary ammonium hydroxide type, having quaternary ammonium hydroxide groups attached to a suitably cross linked polystyrene structure. These exchangers were contained in a column having a height of 40 cm. and a diameter of 10.5 cm. The pH of the effluent was 5.4 and the dissolved ionized solids were less than 7 p. p. m. A portion of effluent was inoculated with *E. coli* and the resulting solution passed through the hydrogen exchange resin in the silver form. The effluent was sterile and contained no silver ions to the chloride test. The silver exchanger was prepared by contacting 120 cc. of the hydrogen exchange resin with 500 cc. of 1 N silver nitrate solution and subsequently washing with demineralized water until free of silver ions, tested by adding an equal portion of 1 N NaCl to a portion of wash water. The same results were obtained by inoculating the tap water with *E. coli* prior to its treatment in the mixed bed.

*Example II.—Sterile demineralized sucrose solution*

A 30% raw sucrose solution containing about 300 p. p. m. of dissolved ionized substances was first passed through a column of anion exchange resin in the hydroxyl form and subsequently through a column of cation exchange resin in the hydrogen form. The hydroxyl exchanger was contained in a column having a height of 20 cm. and a diameter of 3.5 cm., and the hydrogen exchanger was contained in a column having a height of 35 cm., and a diameter of 3.5 cm. The pH of the effluent, de-ashed sugar solution, was 6.0, and the ash content was 10 p. p. m. This solution was inoculated with *E. coli* and was then passed through the hydrogen exchange resin in the silver form. The resulting solution was sterile, demineralized and substantially free from silver ions to the 1 N NaCl test described above. The silver resin was prepared as described in Example I, except that cation-exchange resin (a product made under U. S. Patent 2,366,007) was used, and was contained in a column 2.5 cm. in diameter and 20 cm. in height.

The same results were obtained with a 30% raw sugar solution contaminated with the usual micro-organisms which cause the fermentation and biological deterioration of such solutions.

The foregoing examples have been selected for purposes of illustration and are not intended to suggest limitations not otherwise described or set forth in the claims. It will be apparent that this process lends itself to various modifications without departing from the scope of the invention. For instance, liquids which are available in a demineralized condition, such as rain water, do not require a preliminary demineralization treatment, but may be contacted directly with the silver exchanger for sterilization. It will further be understood that, although the cation resin in the silver form is referred to conveniently as a silver exchanger, a criterion of the process of this invention is that insignificant amounts of silver are actually removed from the resin, that is, exchanged.

It is contemplated that the process of this invention may be carried out in a mixed bed of hydrogen exchanger, hydroxyl exchanger and silver exchanger, especially where the exchangers are expendable, for the regeneration of such a bed is unnecessarily difficult.

A more convenient apparatus, shown in the drawing, consists of a column 10 containing an upper bed 12 of hydrogen resin and hydroxyl resin, either mixed or separate (shown as separate and comprising an upper bed section 12a of hydrogen resin and a lower bed section 12b of hydroxyl resin), and a lower bed 14 of the silver exchanger, upper and lower referring to the direction of fluid flow through the beds. The beds are separated by foraminous partitions 20. In such an apparatus the solution enters through a conduit 16 communicating with the top of the column 10 and flows first through a demineralizing section of hydrogen exchanger and hydroxyl exchanger, and finally through the sterilizing section of silver exchanger and discharges through the conduit 18 provided at the bottom of the column. The segregation of the exchangers facilitates their removal from the column for separate regeneration. Where a bed of mixed hydrogen exchanger and hydroxyl exchanger is used, the exchangers may be of different densities so that they may be separated for regeneration by a flotation process, as described in "Ion Exchange Resins," page 109 et seq.

I claim:
1. The method of preparing substantially demineralized and sterile liquids comprising substantially demineralizing the liquid by means of a hydrogen exchanger and a hydroxyl exchanger to the extent of less than 50 p. p. m. dissolved ionized substances and subsequently contacting the liquid with a cation exchanger in the silver form.

2. The method of sterilizing aqueous solutions comprising reducing the content of dissolved ionized substances to less than 50 p. p. m., adjusting the pH to between 4 and 10, and finally contacting the solution with a cation exchange resin in the silver form.

3. The method of sterilizing aqueous liquids having less than 50 p. p. m. of dissolved ionized substances and a pH of between 4 and 10 which comprises contacting the liquid with a cation exchange resin in the silver form.

References Cited in the file of this patent

UNITED STATES PATENTS

| Number | Name | Date |
|---|---|---|
| 2,066,271 | Irwin | Dec. 29, 1936 |
| 2,167,225 | Van Eweyk | July 25, 1939 |
| 2,404,367 | Durant et al. | July 23, 1946 |
| 2,434,190 | Barnes et al. | Jan. 6, 1948 |
| 2,512,053 | Calmon | June 20, 1950 |
| 2,525,497 | Monfried | Oct. 10, 1950 |
| 2,600,719 | Wood | June 17, 1952 |

FOREIGN PATENTS

| Number | Country | Date |
|---|---|---|
| 569,661 | Great Britain | June 4, 1945 |

OTHER REFERENCES

Ind. & Eng. Chem.; Feb. 1943, pages 186–192.